Figure 1:
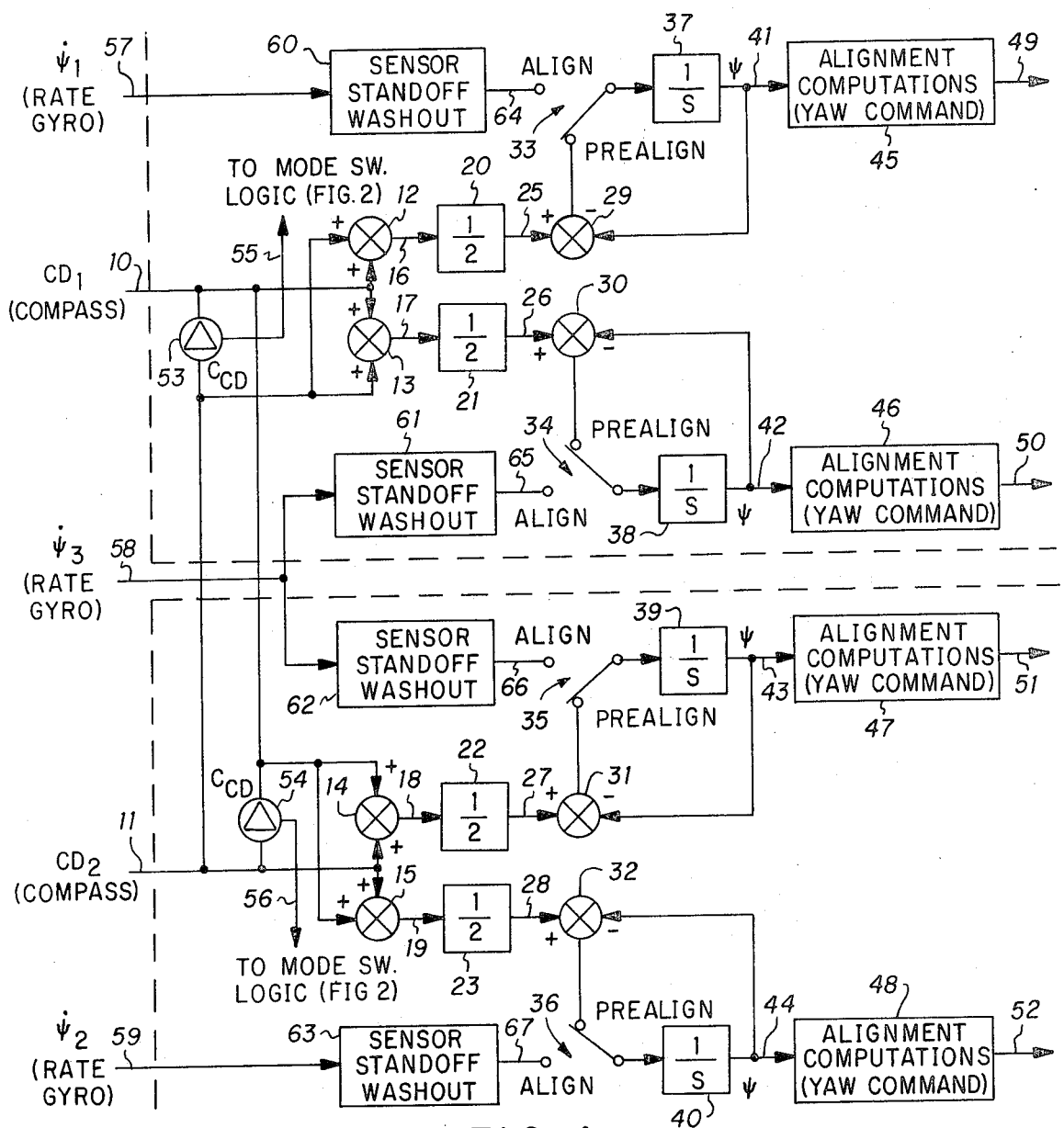

United States Patent [19]
Hall et al.

[11] 3,816,718
[45] June 11, 1974

[54] SYNTHESIS OF FAIL OPERATIONAL HEADING INFORMATION (COURSE DATUM) FROM NONFAIL OPERATIONAL INPUT SIGNALS

[75] Inventors: John C. Hall, Cedar Rapids, Iowa; Robert F. Tribuno, Santa Monica, Calif.

[73] Assignee: Collins Radio Company, Dallas, Tex.

[22] Filed: Nov. 24, 1972

[21] Appl. No.: 309,306

[52] U.S. Cl. .... 235/150.26, 235/153 AE, 244/77 R, 307/204, 328/147, 328/154
[51] Int. Cl. .......................... G06g 7/78, G06g 7/12
[58] Field of Search ................ 235/150.26, 153 AE; 307/204, 219, 235; 328/137, 147, 154; 244/77

[56] References Cited
UNITED STATES PATENTS

| | | | |
|---|---|---|---|
| 3,476,922 | 11/1969 | Yiotis | 235/153 AE |
| 3,496,836 | 2/1970 | Jenney | 244/77 |
| 3,596,107 | 7/1971 | Kittrell | 307/204 |
| 3,614,401 | 10/1971 | Lode | 235/153 AE |
| 3,631,352 | 12/1971 | Kelley et al. | 328/147 |
| 3,667,057 | 5/1972 | Pfersch, Jr. et al. | 328/147 |
| 3,670,148 | 6/1972 | Moses | 307/204 |

OTHER PUBLICATIONS

Rostek; "Make Systems Fail-Operational by Using Multiple Channels with Automatic Voters to Select Best Signal," Electronic Design 17; 8/16/69, pp. 213–215.

Moreines et al.; "Majority Voting Protects Aircraft & Pilot" Electronics 5/18/64, pp. 85–91, Vol. 37, No. 16.

Primary Examiner—Charles E. Atkinson
Assistant Examiner—Errol A. Krass

[57] ABSTRACT

Synthesis of fail operational plural output signals from input signals, insufficiently redundant to be fail operational in themselves, is accomplished by referencing plural integrators to the input signal and subsequently integrating down the references by application to the integrators, in lieu of the input signals, respective ones of a plurality of further input signals each of which is a measure of the rate of change of the referencing inputs, and of themselves sufficiently redundant to provide fail operational control in subsequent control means to which a logically best one of the output signals is applied.

8 Claims, 2 Drawing Figures

SYNTHESIS OF FAIL OPERATIONAL HEADING INFORMATION (COURSE DATUM) FROM NONFAIL OPERATIONAL INPUT SIGNALS

This invention relates generally to generation of command signals for aircraft control, and more particularly to means for redundantly computing a plurality of command signals which may be collectively utilized in a fail operational control system, with the plural computations being made from input sensor signal sources which of themselves are not sufficiently redundant to be used in a fail operational system.

The present invention finds special usage in aircraft guidance control systems of state-of-the-art types wherein redundant command signals are generated and the logically best one of a plurality of independently computed command signals is selected for ultimate control command. Thus, failure of one or more of the sensor inputs and/or the computations in independent computation channels, together with a means for detecting such failure and eliminating signals emanating from a failed channel from being selected for ultimate control, permits a multimode type of operation in that logically safe control may continue upon failure of one or more of the independently computed commands.

For example, a roll command signal as would be applied to a servo system to control ailerons might be computed from various input parameters a number of independent or quasi-independent times. Such a system might comprise four independent computations with a provision for fail operational operation in the event of failure of one or more. Signal selectors or "voters" as defined in U.S. Pat. No. 3,596,107 to Richard L. Kittrell, entitled "Signal Selector," and assigned to the assignee of the present invention, provides means for selecting a logically best one of a plurality of redundantly computed control signals and operates generally on a mid-value signal selection logic. The system defined in U.S. Pat. No. 3,596,107 includes a voter mode switching logic means so that the voting process may comprise selection of a predetermined one of the two mid-value signals with all four channels operational, or, upon failure of a particular channel, selection of the mid-value one of three remaining channel computations. In the event of failure of two of the computation channels a fail operational system is maintained by utilizing the two remaining good channels in conjunction with the system ground, for example, on a mid-value logic voting principle.

The present invention has as a primary object the provision of a means for computing quadruple yaw command signals (as might be used, for example, in commanding a decrab maneuver prior to aircraft touchdown) from input sensors which of themselves are not sufficiently redundant to permit a logical voting process. The system of the present invention, as will be further described, generates four yaw command signals from course datum information which of itself is not sufficiently redundant to permit a fail operational system operation.

The system to be described is featured in the provision of the development of four yaw command signals by the synthesis of four separate course datum signals which in the steady state condition are proportional to the existing crab angle of the aircraft. The computation of four fail operational yaw command signals is redundantly computed in four channels utilizing only first and second course datum (compass) input signals to reference signal integrators in each of the computation channels. First second and third yaw rate gyro inputs are employed in the quadruple computation system to integrate down the integrators in each of the channels as the aircraft responds in yaw rate to the yaw command output signal. The system then provides four quasi-independently computed output signals which may be applied to signal voting system for selection of the logically best one of the command signals for actual aircraft control. It is to be understood that the computation of four redundant command signals from but two independent sources would not provide sufficient redundancy to permit a voting process, which processes must necessarily operate on the selection of the logically best one of at least three signals. This philosophy is described in above-referenced U.S. Pat. No. 3,596,107.

A further feature of the present invention is the development of quadruple redundant yaw command signal computations from a pair of course datum sensor inputs and three yaw rate gyro input signals wherein the pair of course datum signals are averaged in each of four computation channels for use as the reference for an integrator in the channel, and wherein first and second ones of the rate gyro sensor input signals are subsequently utilized to integrate down from the course-datum reference established integrator output signal in associated first and second ones of the channel upon aircraft response to the yaw command signal, with the third one of the rate gyro yaw command input sensors being applied to integrate down the course datum established reference in each of the integrators in the remaining two channels upon aircraft response to the yaw command signal.

Figure 2:
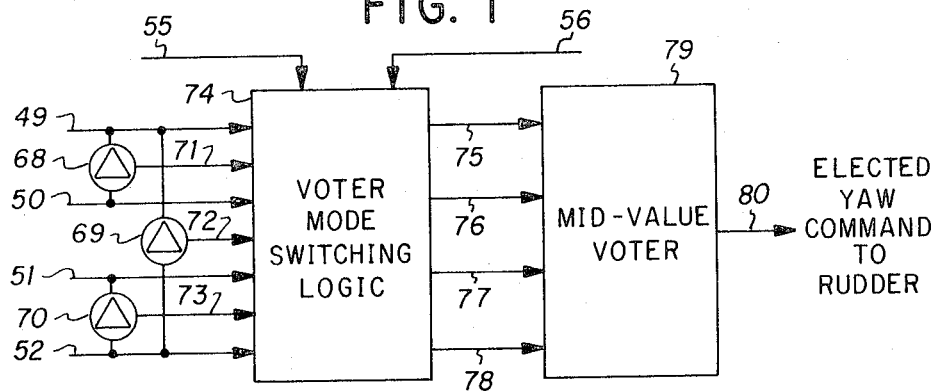

These and other features and objects of the present invention will become apparent upon reading the following description with reference to the accompanying drawing in which FIG. 1 is a functional block diagram of a quadruple fail operational yaw command signal development in accordance with the present invention; and FIG. 2 is a functional diagram depicting voter mode switching and mid-value voting to select a logically best one of the four computed command signals of FIG. 1.

Four computation channels are depicted functionally in FIG. 1. Each of these channels is identical as to its computation functions. Each of the channels utilizes course datum ($\psi$) to reference an integrating means (during a first (PREALIGN) mode of operation) to the applied course datum signal. In a second operational mode (ALIGN), each of the channels utilizes a yaw rate signal ($\dot{\psi}$) to integrate down the course datum referenced value of the integrator. The general computation in each of the four channels is like that described and claimed in copending application Ser. No. 309,308, filed Nov. 24, 1972, entitled "Crab Angle Reference Signal Development for Limited Forward Slip Landing Maneuver" by Jimmie L. Foster and Robert F. Tribuno.

The present invention resides in the particular manner in which available (and insufficiently redundant) input parameters are utilized to develop four fail operational yaw command output signals.

In accordance with the present invention each of the four depicted computation channels utilizes the average of two course datum input signals 10 and 11 for referencing an associated one of integrators 37, 38, 39 and 40 to the course datum signal existing during PREALIGN mode of operation. As described in the above-referenced copending application, the alignment computation provided by each of the channels may develop a yaw command output signal for subsequent application to an aircraft yaw command steering autopilot or pilot, the response to which effects a decrab maneuver of the aircraft prior to touchdown. The PREALIGN mod might, as defined in the above-referenced copending application, be effected for aircraft altitudes in excess of, for example, 150 feet. As the aircraft descends to 150 feet altitude a trip point is sensed (as by an onboard altimeter) to place the signal computations channels into ALIGN mode. As the aircraft responds to the decrab yaw command signal, the sensed yaw rate is utilized to integrate down the course datum derived integrator reference such that a decrab maneuver is smoothly and accurately attained.

Since the computation system of the present invention utilizes first and second course datum input signals 10 and 11, which of themselves are insufficiently redundant to provide independent plural output computations which might logically be employed in a fail operational control system, the average of the two course datum signals is utilized to reference the integrators in all channels. Thus, the uppermost channel depicted in FIG. 1 includes a signal combining means 12 to which the course datum signals 10 and 11 are additively applied. The output 16 of the combining means 12 comprises the sum of the two course datum signals which is applied through a 1/2 gain factor means 20 to provide a signal 25 corresponding to the average of the two course datum input signals 10 and 11.

In similar fashion, signal combining means 13, 14 and 15 of the remaining channels, in conjunction with associated ½ gain factor means 21, 22 and 23, provide average course datum signals 26, 27 and 28 for use in the remaining three of the depicted computation channels.

In the depicted PREALIGN mode each channel develops an integrator output which corresponds to the average course datum signal being applied to the channels. Thus the uppermost depicted channel includes a signal combining means 29 to which the average course datum signal 25 and the output 41 from the associated integrating means 37 are applied as mutually subtractive inputs. In the PREALIGN mode depicted, the input to the integrator 37 comprises the output from the signal combining means 29 and it is thus apparent that the output 41 from the integrator rises to a point where it equals the average course datum signal 25 at which time the integrator output 41 and the course datum input reference 25 null one another in the signal combining means 29.

In a similar manner, average course datum signals 26, 27 and 28 are developed as referencing inputs to the integrators 38, 39 and 40 associated with the remaining three channels. Mode switches 34, 35 and 36, in the illustrated PREALIGN mode, apply integrator outputs 42, 43 and 44 to associated signal combining means 30, 31 and 32 to subtract from the respective course datum reference input signal. The output of the signal combining means corresponding to the discrepancy between the integrator outputs and the course datum reference input signals is applied to the integrator as an input signal, such that the integrator outputs 42, 43 and 44 comprise signals referenced to the average course datum signal applied to the channel.

The outputs from the integrators in each of the four channels might then be applied to yaw command alignment computation circuitries 45, 46, 47 and 48, the outputs 49, 50, 51 and 52 of which comprise yaw command output signals.

The computation channels, in response to ALIGN mode being effected, utilize three yaw rate gyro inputs 57, 58 and 59 to integrate down the course datum reference in the channel integrators. A first rate gyro input 57 is applied to integrate down the integrator 37 in the uppermost depicted channel. A second yaw rate gyro input 59 is utilized to integrate down the integrator 40 in the lowermost depicted channel, while the remaining yaw rate gyro input 58 is applied, in common, to each of the mid channels depicted, to integrate down the respective associated integrators 38 and 39. Each of the channels, as described in the above-referenced copending application might further include sensor standoff wash-out means 60, 61, 62 and 63 to remove any sensor offset in PREALIGN so that only true rate sensed by the sensors is utilized for application to the channel integrators. The wash-out is switched to a hold configuration in ALIGN.

The system thus provides for computation of four yaw command output signals utilizing the average of two available course datum input signals as a reference for course datum integrators in each of the channels. Yaw rate (which necessarily will be oppositely sensed to the course datum signal existing in the channel integrators) is used to integrate down the course datum established reference in response to aircraft yaw rate experienced when the computed yaw command is responded to. Two of the four depicted channels independently receive first and second yaw rate gyro input sensor signals, while the remaining pair of the channels receive the third yaw rate gyro input signal in common. Thus the insufficiently redundant course datum signals 10 and 11, stemming from first and second compasses (actually the discrepancy between a commanded heading and that heading being experienced) which in the steady state mode and assuming an on course condition in a landing maneuver correspond to aircraft crab angle, are utilized only to reference course datum synchronizers in each of the four computation channels and in ALIGN mode these synchronizers (integrators) have applied thereto sufficiently redundant sensor input signals (first, second and third rate gyro signals) that a logical selection of the best one of the four computed yaw command signals may be determined.

A signal selection, on a fail operational basis, of the best one of the redundantly computed command signals may then be realized by utilizing signal comparators to compare all possible pairs of the yaw rate output commands exclusive of the intermediate channel pair depicted in FIG. 1 which share a common sensor input, namely the common yaw rate input 58.

As described in the above-referenced U.S. Pat. Kittrell No. 3,596,107, a voting means may select one of the two mid-values of four applied inputs in accordance with a predetermined truth table, when all four inputs are deemed valid by comparators. With reference to FIG. 2, a comparator 68 compares the relative magnitudes of the output command signals 49 and 50; a comparator 70 compares the relative magnitudes of the output command signals 51 and 52; while a third comparator 69 compares the relative magnitudes of the command signal outputs 49 and 52. A comparator is not utilized for the two "mid" channels depicted in FIG. 1, since these channels share a common input sensor and, in accordance with voter logic, as outlined in U.S. Pat. No. 3,596,107, these channels might suffer from a common hardover condition due to a common rate gyro failure. A comparator operating on a relative basis would not detect this common failure.

Each of the comparators 68, 69 and 70 might comprise any one of a number of known expedients providing an output signal level (logic level) change when a predetermined difference in magnitude exists between a pair of applied input signals. FIG. 2 illustrates a voter mode switching logic means 74 which might be of a type described and claimed in the above-referenced Kittrell U.S. Pat. No. 3,596,107 which in conjunction with the four computed command input signals 49-52 and the outputs 71, 72 and 73 from the comparators associated with certain signal pairs, control the application of command signal outputs 75, 76, 77 and 78 to a signal voter 79. The voter mode switching logic circuitry 74 might be further responsive to further comparator output 56 from comparators 53 and 54 associated with the course datum input signals 10 and 11. As described in Kittrell U.S. Pat. No. 3,596,107 should the comparators indicate four "good" computations, voter 79 might select one of the two mid-term values exclusive of the most algebraic positive and negative values to provide a selected output command 80 for subsequent rudder command.

As further described in Kittrell U.S. Pat. No. 3,596,107 the voter mode switching logic might include switching means for eliminating from the subsequent voting process a logically "invalid" input command signal 49-52 and the voter might then convert to a mid-value voter based on three inputs. A still further voting process might continue fail operational command signal development by reverting the voting process (in the event of two detected "failed" channels) to a mid-value vote between two "good" command signals and system ground.

The present invention is seen to provide, in a quadruple redundant command signal development system, means for providing fail operational output commands as formulated from sensor inputs which of themselves are insufficiently redundant to be used in a fail operational control system.

Although the present invention has been described with respect to a particular embodiment and usage, it is not to be so limited as changes might be made therein which fall within the scope of the invention as defined in the appended claims.

We claim:

1. In an aircraft automatic flight control system apparatus for synthesizing a plurality of N fail-operational information signals each proportional to a predetermined aircraft existing performance parameter comprising at least one sensor signal source providing a measure of existing performance, at least three sensor signal sources providing a measure of existing rate of change of said performance parameter, a plurality of N computation channels, means in each of said computation channels to reference an associated integrator to a performance parameter sensor defined signal in a first operational mode and, in a second operational mode, to apply the signal from one of said rate of change performance parameter sensors to said associated one of said channel integrators, the output from said respective channel integrators comprising respective ones of said synthesized information signals.

2. A control system as defined in claim 1 comprising plural performance parameter senors, means to apply all sensor signal sources providing a measure of existing performance parameter to each of said plurality of N channels, and each of said plurality of N channels including means for averaging the performance parameter signals applied thereto, the outputs from the means for averaging of each of said N channels being applied to reference the associated integrators in each of said channels.

3. A control system as defined in claim 1 wherein the rate of change of performance parameter signals from selected ones of said rate of change sensors are applied individually as inputs to selected ones of said plurality of N channels, signals from other selected ones of said rate of change sensors being applied in common to selected pairs of the remaining ones of said channels, signal comparator means responsive to the relative pairs of channel output signals exclusive of those pairs to which said rate of change of performance sensor signals are applied in common, and signal selection logic means responsive to outputs from said comparator means to select a predetermined mid-value one of said plurality of N channel outputs for application to an output control line, said comparator responsive logic means including means to exclude from said mid-value selection those of said plurality of channel output signals the magnitudes of which differ from those applied to said signal selection means by a predetermined magnitude.

4. A control system as defined in claim 3 wherein at least two sensor signal sources providing a measure of existing performance are utilized and including further signal comparison means receiving respective pairs of said performance parameter sensor signals, said signal selection logic means being further responsive to said further signal comparison means to select a logically best one of said computer channel output signals.

5. In an aircraft flight control system, apparatus for synthesizing quadruple fail-operational aircraft performance indicative signals from first and second aircraft performance indicative sensor input signals and first, second and third sensor input signals indicative of rate of change of said aircraft performance, comprising first, second, third and fourth signal computation channels; each of said signal computation channels comprising means for averaging said first and second performance indicative input signals, signal integrating means, switching means, said averaged signal being applied to said integrating means in a first position of said switching means to reference said integrating means output to said average performance indicative input signal; signal integrating means associated with first and fourth ones of said signal computation channels receiving as inputs respective first and second ones of said rate of change of performance input signals in lieu of said average performance signal in a second position of the associated one of said switching means, signal integrating means associated with second and third ones of said signal computation channels each receiving as inputs the third one of said rate of change of performance input signals in lieu of said average performance signal in a second position of associated ones of said switching means, and means responsive to the outputs of the integrators in each of said computation channels to develop respective ones of said fail-operational aircraft performance indicative signals.

6. A control system as defined in claim 5 further comprising signal comparison means receiving and comparing the respective computation channel outputs and exclusive of a comparison between the second and third ones of said computation channels, said signal comparing means developing predetermined output signals responsive to a predetermined amplitude discrepancy between the respective applied signal pairs, and logic signal voting means responsive to said comparison means output signals and the relative magnitudes of the channel outputs applied thereto to select a logically best one of said command signals for application to a command output line.

7. In an aircraft flight control system, apparatus for synthesizing quadruple fail-operational heading information signals from first and second course datum input signals and first, second and third yaw rate gyro input signals comprising first, second, third and fourth signal computation channels; each of said signal computation channels comprising means for averaging said first and second course datum signals, signal integrating means, switching means, said averaged course datum signal being applied to said integrating means in a first position of said switching means to reference said integrating means output to said average course datum input signal; first and second ones of said signal integrating means receiving as inputs respective first and second ones of said yaw rate gyro input signals in lieu of said average course datum signal in a second position of the associated one of said switching means, third and fourth ones of said signal integrating means each receiving as inputs the third one of said yaw rate gyro input signals in lieu of said average course datum signal in a second position of associated ones of said switching means, means responsive to the outputs of the integrators in each of said computation channels to develop a yaw command signal, signal comparison means receiving and comparing the respective computation channel outputs and exclusive of a comparison between the second and third ones of said computation channels, said signal comparing means developing predetermined output signals responsive to a predetermined amplitude discrepancy between the respective applied signal pairs, and logic signal voting means responsive to said comparison means output signals and the relative magnitudes of the channel outputs applied thereto to select a logically best one of said command signals for application to a command output line.

8. In an aircraft automatic flight control system, apparatus for synthesizing quadruple fail-operational heading information signals from first and second course datum input signals and first, second and third yaw rate gyro input signals comprising; first, second, third and fourth signal computation channels; each of said signal computation channels receiving said pair of course datum input signals and comprising means for averaging said pair of course datum input signals, signal synchronizing means including switching means and a signal integrator, said signal synchronizing means receiving the output of said means for averaging and developing an integrator output equal to the output from said means for averaging with said switch means in a first position thereof, whereby said integrator output is referenced to the output from said means for averaging; first and second ones of said yaw rate gyro input signals being applied as respective inputs to the integrators in first and fourth ones of said computation channels in lieu of the output from said means for averaging with the associated one of said switching means in a second position thereof; a third one of said yaw rate gyro input signals being applied as input to the integrators in each of second and third ones of said computation channels is lieu of the output of said means for averaging with said switching means in a second position thereof, and the outputs from the respective integrators in each of said first, second, third and fourth computation channels comprising said quadruple heading information signals.

* * * * *